United States Patent [19]

Fair et al.

[11] Patent Number: 4,730,692
[45] Date of Patent: Mar. 15, 1988

[54] APPARATUS FOR MARINE SHEAR WAVE PROSPECTING

[75] Inventors: Delbert W. Fair; Graydon L. Brown, both of Ponca City, Okla.

[73] Assignee: Conoco Inc., Ponca City, Okla.

[21] Appl. No.: 215,945

[22] Filed: Dec. 12, 1980

[51] Int. Cl.$^4$ .................................................. G01V 1/14
[52] U.S. Cl. .................................... 181/114; 367/143; 181/120
[58] Field of Search ............... 367/143, 75; 181/110, 181/114, 120, 118, 401; 248/503; 89/5

[56] References Cited

U.S. PATENT DOCUMENTS

| | | | |
|---|---|---|---|
| 1,523,659 | 1/1925 | Reno | 89/5 |
| 3,301,345 | 1/1967 | Carder | 181/401 |
| 3,372,770 | 3/1968 | Clynch | 181/401 |
| 3,717,217 | 2/1973 | Muecke et al. | 181/114 |
| 3,718,206 | 2/1973 | Boff et al. | 181/114 |
| 4,008,784 | 2/1977 | Bays | 181/114 |
| 4,135,598 | 1/1979 | Stafford | 181/114 |
| 4,182,428 | 1/1980 | Savit | 181/401 |
| 4,219,096 | 8/1980 | Airhart | 181/402 |
| 4,301,888 | 11/1981 | Gibson et al. | 181/401 |

*Primary Examiner*—Nelson Moskowitz
*Attorney, Agent, or Firm*—Richard K. Thomson

[57] ABSTRACT

An underwater vibrator is specifically adapted for generating a shear wave in a seabed and includes a frame; locomotion apparatus attached to the frame for moving the vibrator over the seabed; and cable means connected between a surface support vessel and the vibrator. The vibrator also includes buoyancy and apparatus for selectively controlling the buoyancy along with apparatus for selectively engaging the seabed with the vibrator. Apparatus is also carried by the vibrator for viewing the location of the vibrator under the water which includes lights and television equipment.

19 Claims, 5 Drawing Figures

APPARATUS FOR MARINE SHEAR WAVE PROSPECTING

DISCUSSION OF THE PRIOR ART

Mobile systems for pressure wave (P-wave) seismic exploration are basically well known as illustrated by U.S. Pat. No. 3,717,217 issued to Kurt H. Muecke et al. This patent discloses a pressure wave vibrator which has a track-type locomotion system with a vibrator mounted at the forward end and a vibrator mounted at the rearward end of the apparatus. Both vibrators are adapted through mechanical linkage to be lowered onto the ground in a manner to apply bias to the vibrators so that a pressure wave or P-wave can be developed onto the surface of the earth and transmitted into the subterranean stratum. U.S. Pat. No. 3,983,957 issued to Daniel Silverman is another pressure wave apparatus which utilizes two vibrators, however, in this apparatus the entire frame of the vehicle comprises a mass rather than the mass being a portion of the vibrator itself. This vehicle, likewise, has a locomotion means. Both of the above-referenced patents are apparatuses for developing pressure waves into the ground on the surface of the earth in a dry or land environment. U.S. Pat. No. 4,143,736 issued to Delbert W. Fair entitled "Seismic Transducer Construction" relates to a seismic transducer for generating shear waves into an elastic medium. The transducer comprises a mass member which has more than one parallel hydraulic cylinder disposed therein. A piston member is disposed in each cylinder, and each piston member includes a piston with a pair of oppositely extending piston rods. A frame interconnects the ends of the piston rods, which frame has a surface thereon for engaging a surface of the elastic medium such as the earth. The base also includes a ground engaging means such as pyramids for providing a continuous coupling to the shear wave vibrator as energy is being transmitted to the frame.

BRIEF DESCRIPTION OF THE INVENTION

This invention basically relates to an underwater shear wave vibrator which has a frame with locomotion means attached on opposite sides of the frame. An umbilical cable is attached between surface support equipment and the frame and carries electrical power, command signals, data signals, a strength member, and, if desired, compressed air. The frame also carries buoyancy means for controlling the flotation of the assembled vibrator apparatus. At each end of the frame is mounted a shear wave vibrator which has a hydraulic means for lifting and lowering the vibrator against the seabed for engagement with the seabed so that seismic energy can be transmitted therein. The vibrator may be biased against the seabed by applying the weight of the vehicle onto the vibrators. The vibrator frame also includes a horizontal frame positioning means for moving the vibrator to a location for transmitting a shear wave seismic signal into the seabed. A cable or lift apparatus may be attached between the surface support apparatus and the vibrator for lowering or raising the vibrator onto the support equipment or onto the seabed, respectively. Thrusters may also be used singularly or in combination with other transportation means for moving and locating the vibrator assembly.

DETAILED DESCRIPTION OF THE INVENTION

Figure 1:
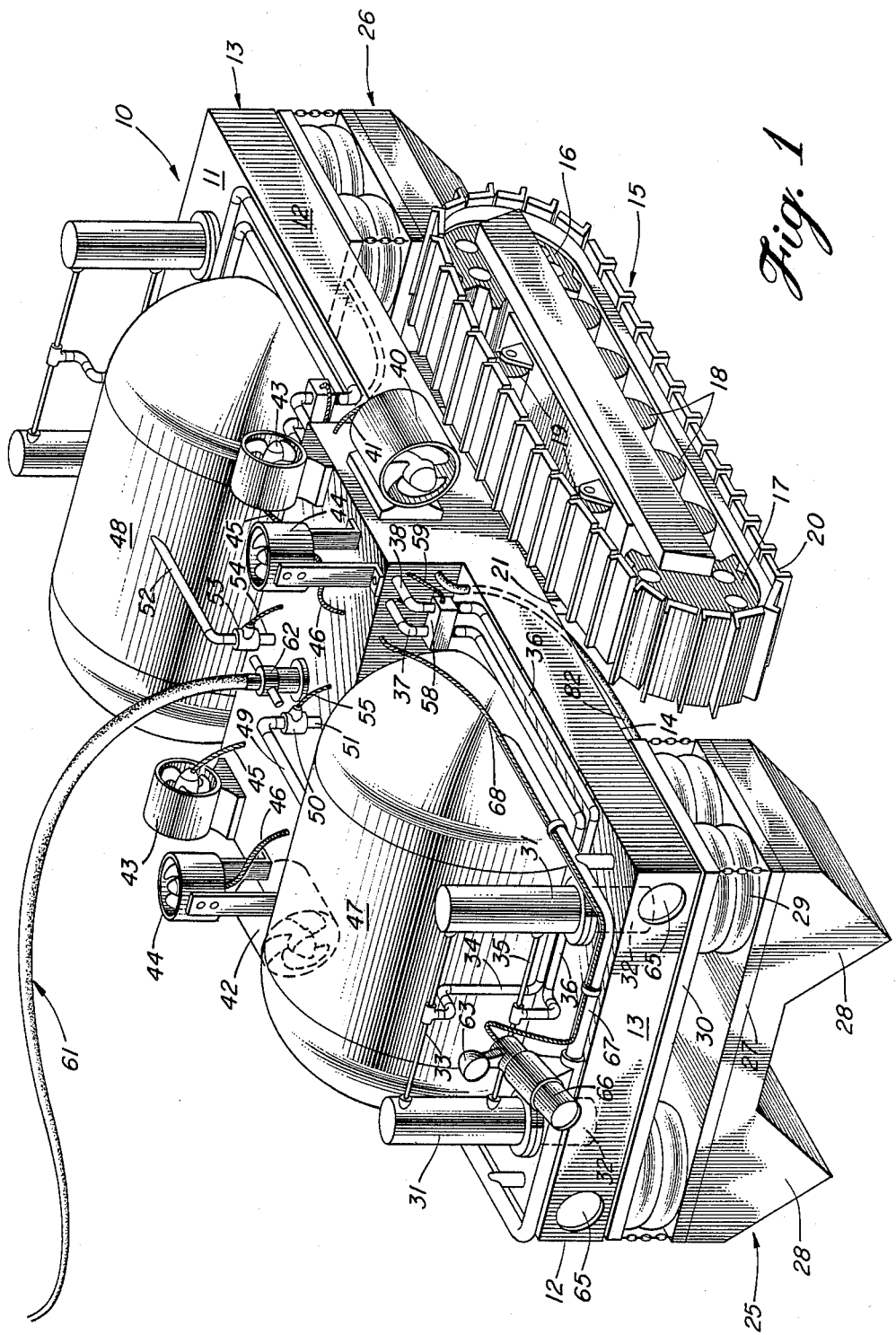
FIG. 1 is an orthogonal view of an underwater shear wave vibrator built in accordance with the teachings of this invention.
Figure 2:
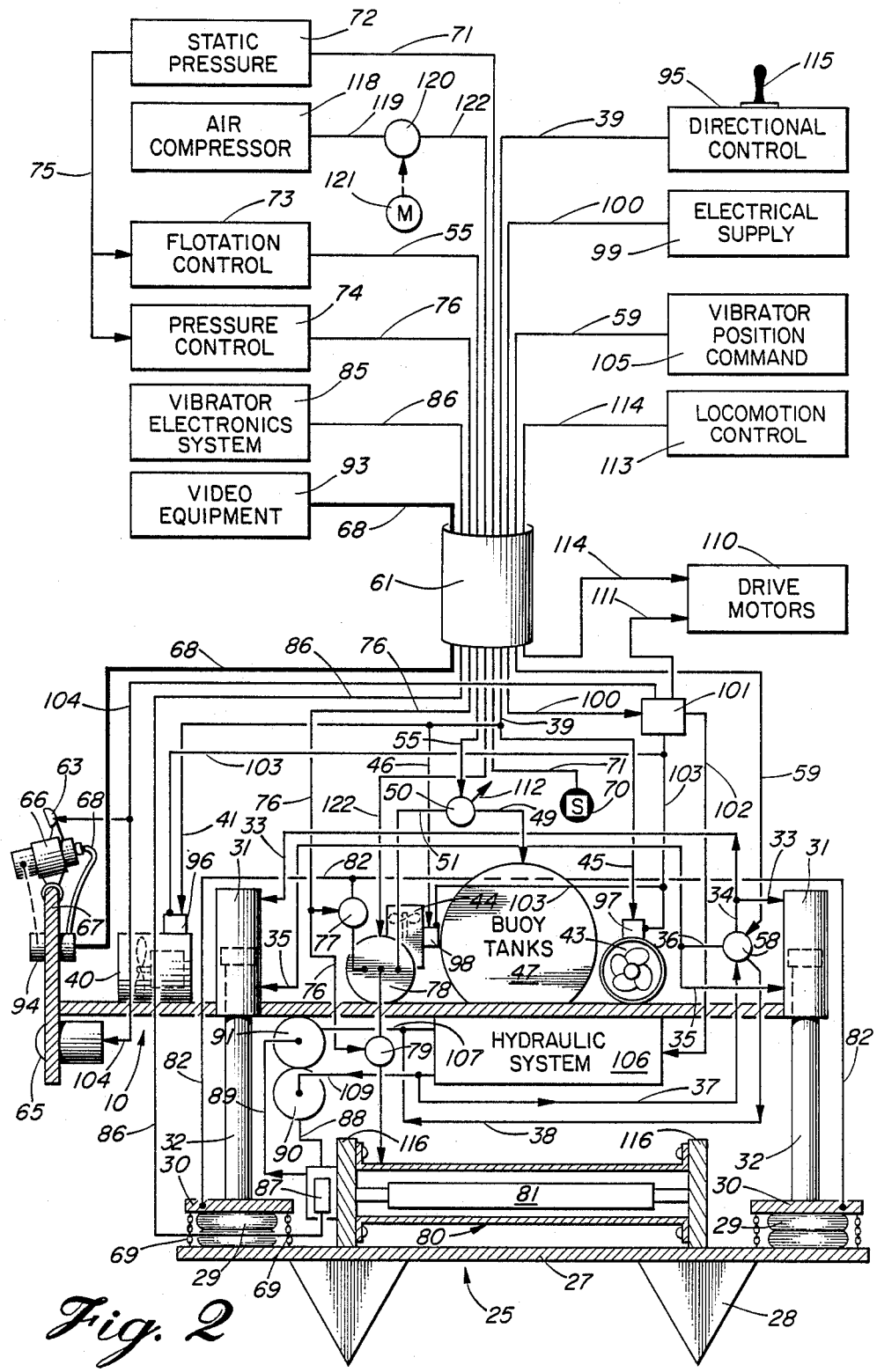
FIG. 2 is a schematic of the operational function of the vibrator and support equipment.

Referring to all of the figures but in particular to FIGS. 1 and 2, a preferred embodiment of an underwater shear wave vibrator is illustrated which has a frame generally referred to by arrow 10 which includes a top 11, side walls 12, end walls 13 and bottom 14. Locomotion means for the vibrator along the surface of the seabed is provided by a track-type driving apparatus generally referred to by arrow 15. The track-type track is illustrated as being single track on each side. It is obvious that multiple tracks could be used. Further, wheels can be substituted. If movement is restricted to thrusters or cables, then a skid could be incorporated. Track driving apparatus is well known in the art and will not be further described other than to comment that the driving means does include a motor driven gear 16, an idling gear 17, and smaller idling rollers 18 which provide support along the bottom of the track apparatus to support belt 20. Upper support rollers 19 merely supply support for the upper portion of belt 20. The entire apparatus is attached to frame 10 in any manner such as, for example, brackets 21. Driven gear 16 may be powered either hydraulically or electrically as desired. The hydraulic vibrator generally referred to by arrow 25 is attached to the front end 13 of frame 10, and a second hydraulic vibrator 26 is attached to the rearward end 13 of frame 10.

Each hydraulic vibrator comprises a base plate 27 which has ground engaging means 28 attached thereto. Isolation means such as air bags 29 may be attached to base plate 27 and to a second plate 30 for isolating the shear wave vibrator from frame 10. Hydraulic lift means 31 generally includes a cylinder and piston with the piston rod extending down to and coupled to second plate 30. The piston, piston rod and cylinder are not illustrated. The extension of the piston rod 32 is illustrated attached to second plate 30. Hydraulic conduits 33 are coupled through a conduit 34 to a hydraulic control valve 58 and then through a pipe 37 to a hydraulic pumping system (not shown). A second conduit 35 is, likewise, coupled between hydraulic lift means 31 and the conduit 36 to hydraulic control valve 58. Pipe 38 is connected to a sump (not illustrated). A horizontal thruster which has force along the axis along frame 10 is illustrated at 40. Horizontal thruster 40 is driven electrically through a wire 41 which is coupled to frame 10 and to an internal control system (not illustrated). A second horizontal thruster 42 can be mounted on the other side 12 of frame 10 to add additional thrust and maintain a controllable thrust about the axis of frame 10. In order to develop thrust normal to the axis of frame 10, thrusters 43 are mounted to frame 10 so that the axis of thrust is normal to the axis of frame 10. Thrusters 43 develop a thrust toward the center of frame 10. In the case illustrated, movement of the thrusters 43 will provide lateral movement to frame 10. Each of the thrusters 43 is driven electrically through wires 45. Thrust is provided by thrusters 44 coupled through wires 46 to the control circuit and power for the thrusters. All thrusters 40, 43 and 44 are illustrated as being powered electrically. It is obvious that they could just as easily be fluid powered and fluid controlled. The particular placement of the thrusters is purely illustrative. They may be placed at any operable location and then numbers increased or decreased depending upon the size and need of the vibrator. The actual control, as mentioned previously, is not illustrated.

Figure 3:
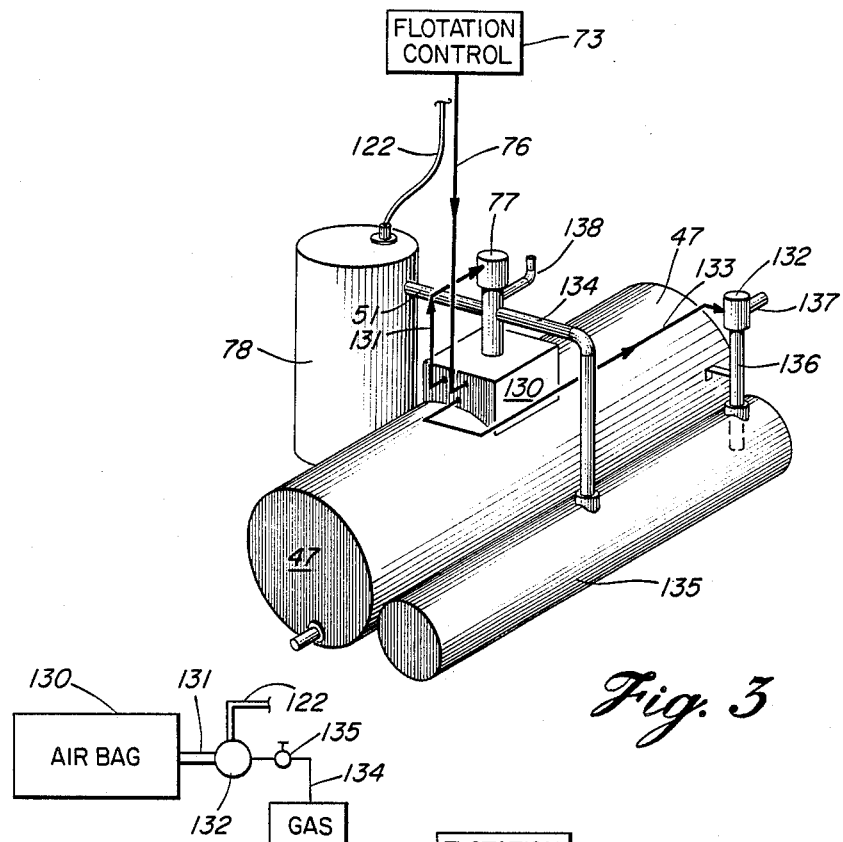
FIG. 3 is one form of ballast which may be carried by the apparatus illustrated in FIG. 1.
Figure 4:
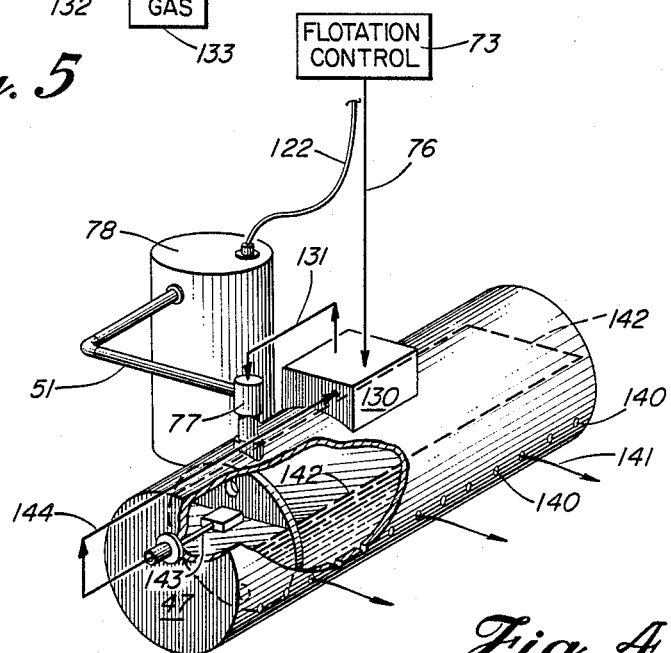
FIG. 4 is another form of ballast which may be carried by the vibrator apparatus illustrated in FIG. 1.

Ballast for the vibrator assembly comprises two tanks 47 and 48. Tank 47 is coupled through a conduit 49 to a control valve 50 and to a source of high pressure air through conduit 51. The source of high pressure air is illustrated in FIG. 2 and is contained within frame 10. Ballast 48 is, likewise, connected through a conduit 52 to control valve 53 and through a conduit 54 to the source of high pressure air. Valve 50 is controlled through an electrical cable 55 and valve 53 is controlled through an electrical cable 56. The method for ballasting the vibrator can be one of several types. Pressurizing tanks, such as that illustrated in FIG. 1, can, using compressed air, force out water inside the tanks, or water may be released into the tanks for controlling the ballast. Other methods for controlling the ballast are illustrated in FIGS. 3 and 4 and will be discussed in a subsequent portion of this application.

Cylinders 31 are controlled in their up or down position by means of valve 58 which is controlled through wires 59. An umbilical cable generally referred to by number 61 is coupled to frame 10 through mechanical and electrical fitting 62.

In order to provide some visual method of operating the vibrator in the water environment, a pair of lights 65 are provided which show forward direction for the vibrator. It is obvious that additional lights can be provided around the vibrator, if needed or desired. In order to supply some form of visual feedback for the operators on the surface to the remotely operated vibrator system, a television camera 66 is provided and mounted on a protection bracket 67 of frame 10. Television camera 66 can be remotely operated so that it can move up and down or from one side to the other side by remote control from the surface. A search light 63 may be mounted on camera 66 to provide light for camera 66 throughout its movement. Control to and information from camera 66 are provided through cable 68.

Chains 69 are provided to protect isolation air bags 29 from tension when the weight of base plate 27 is applied fully to the isolation means 29, particularly when the vibrator is in the lifting or up position. Referring in detail to FIG. 2 the individual systems are schematically laid out. One of the important criterian in operating an underwater system as above described is the maintenance of buoyancy and protection for various systems which are under pressure. Such systems would be, for example, the isolation bags 29, the internal portions of the vibrator which will be described in a subsequent section and the buoyancy tank, for example.

In order to measure static pressure, a static pressure sensing device 70 is coupled through wire 71 to the surface through umbilical cable 61 and connected to a static pressure apparatus 72. Static pressure system 72 can apply an output to the flotation control system 73 or the pressure control system 74 through a wire 75. The output from the flotation control 73 is supplied through wire 55 down umbilical cable 61 to valve 50 which controls the buoyancy of tank 47. Output from the pressure control 74 is supplied through wire 76 to a valve 77. Valve 77 will also supply air under pressure through conduit 82 to isolation means 29. Gas will also be supplied to isolation or air bags 29 in order to maintain the air bags properly inflated in correspondence with the measured static pressure as determined by sensing device 70. Isolation bags 29, if overinflated, will cause coupling between the vibrator and the vehicle 10. If underinflated, the air bags 29 will not support the weight of the vehicle 10. Thus as the vibrator sinks, air pressure must continually be adjusted inside vibrator isolation means 29.

The information is also supplied to a valve 79 which will maintain the internal portion of mass assembly enclosure 80 at a predetermined pressure which exceeds that of the water surrounding it. The pressure will tend to maintain the internal portion mass assembly enclosure 80 free of water seepage, thereby protecting the mechanical parts from rust and damage and further providing freedom for mass 81 to operate.

Information from vibrator electronics system 85 is supplied down a wire 86 to control valve 87. Vibrator electronics 85 provides the proper control of the hydraulic fluid to mass 81. The electronic input of control valve 87 operates in a manner to vary the hydraulic fluid flow being supplied from pipe 88 and to the hydraulic cylinder in mass 81 and exhausting from the cylinder through a pipe or conduit 89. Accumulator 90 provides storage reserve for input conduit 88 and accumulator 91 provides pressure pulse damping at the outlet of the servo valve 87 and the input of line 89.

Video equipment is controlled and the resulting pictures viewed or stored on the video equipment illustrated by 93. Such equipment receives this information via a cable 68 from camera 66. The camera through the cable 68 may also be controlled in both its vertical and horizontal position from information being transmitted through cable 68. A control box 94 provides the electrical to mechanical coupling to camera 66. Directional control is provided from unit 95 which is coupled through a wire 39 to control box 96 for horizontal thruster 40, 97 for thruster 42 and 98 for thruster 44. Thrusters 40, 42 or 44 can be stopped, rotated clockwise or rotated counterclockwise depending upon the directional control signal being supplied down wire 41 to control boxes 96, 97, or 98, respectively.

Electrical supply from source 99 is supplied down a wire 100 to a control box 101 which will contain a transformer for the splitting out of the proper voltages for each unit requiring power. Electricity is then branched from control box 101 down wires 102 which drives the motor which powers the hydraulic system, down wire 103 to thrusters 40, 42 and 44, and down wire 104 to operate lights 63 and 65, if desired. Vibrator position command control 105 is coupled through a wire 59 to control valve 58. Control valve 58, as previously mentioned, will supply hydraulic fluid to either the upper portion of cylinder 31 through conduit 33 or the lower portion of cylinder 31 through conduit 35. Proper operating vibrator position command 105 will either raise or lower vibrator cylinder rod 32, causing base plate 27 to either raise or lower.

Hydraulic system 106, as previously mentioned, has an electrical power input 102 and hydraulic flow output 37 and hydraulic flow input 38 which are coupled to valve 58 and, likewise, coupled to servo valve 87 and accumulators 91 and 90 through conduits 107 and 89, and 109 and 88, respectively.

The drive motors 110, which move the vehicle and are coupled to drive gear 16 (see FIG. 1), are connected through an electrical circuit 111 to junction box 101. The forward and backward movement of the vibrators can be operated through a surface control 113 which is connected through a wire 114 to drive motors 110.

OPERATION

The operation to the underwater vibrator is best described by reference to FIGS. 1 and 2. The vibrator is lowered into the water in one of two different ways. It can be lowered onto the water and sunk by means of alteration of ballast, or it can be lowered onto the water and supported during the sinking by cables. Cables have not been shown on the vibrator, but such cables are well known in the art and will not be discussed. The vibrator can be lowered using a variation in buoyancy by utilizing the flotation control unit 73 which sends a command down wire 55 to valve 50. When a signal is received at valve 50, if it is desired to sink it, valve 50 is moved into a position to exhaust air out port 112. Air will then leave tanks 47 and 48 and water will enter tanks 47 and 48 causing them to be heavier. As the tanks increases in weight the entire vibrator will begin to be submerged into the water due to its own weight. As the vibrator sinks, sensor 70 will determine the pressure and signal through wire 71 to static pressure apparatus 72. This apparatus will continually monitor the pressure of the water and communicate this monitored pressure to both the flotation control 73 and the pressure control unit 74. If the vibrator is sinking too fast, the pressure control sensing device 70 can indicate the rate of sinking through the wire 75 to flotation control 73 and the reduction of air can be commanded through wire 55 to valve 50. In fact, if the sinking is too rapid, the valve 50 can transfer air from tank 78 through conduit 51 and onduit 49 to the buoyancy tanks forcing additional air into the tanks and forcing water out of the tanks, thereby reducing the buoyancy of the vibrator causing it to arrive at a more neutrally buoyant weight. Furthermore, the vertical thrusters 44 can be energized causing a upward force reducing the descent of the vehicle. Output from the sensing control is also being applied, as previously mentioned, to pressure control unit 74. Pressure control unit 74 will signal a command down wire 76 to valve 77 which will cause additional pressure to be applied to conduit 82 and into the cushion isolation means 29. Simultaneously, additional air is being supplied through wire 76 to valve 79 which is supplying air into mass assembly enclosure 80. Air or gas in the interior of enclosure 80, as previously described, will prevent water from being forced into the interior of enclosure 80 which would normally cause contamination and lead to difficulties in movement of mass 81 during the vibration sequence.

Once the vibrator has reached the seabed, it must be positioned where the seismic survey is to begin. Movement of the vibrator assembly 10 can be accomplished in several ways. (1) With the assembly near neutral buoyancy, thrusters 40, 42, and 44 can be used to position the assembly over long distances, obstacles, trenches and the like. (2) Tracks 15 (or wheels) can be activated for movement over relatively level seabed, over short distances, or to a survey line position. (3) A cable lift system can be employed to lift the assembly from the ship or surface support and move it to a new location. If the track system is used, a command is sent down locomotion control system 113 through wire 114 to drive motors 110. Drive motors 110 can be commanded to move both tracks 20 forward, both tracks rearward, or one track forward and the other track rearward which would facilitate turning of the vibrator. Once the vibrator reaches the bottom, it is also desirable to have lights 63 and 65 lighted and camera 66 energized so that scme idea of the position can be visually observed by the person in the support boat on the surface of the water. It is, of course, also desirable at this time that the vibrator position command unit 105 through wire 106 which is coupled to valve 58 provide hydraulic pressure to lines 35 so that the piston will cause piston rods 32 to be in the up position thus lifting the ground engaging means 28 away from the seabed and thereby prevent difficulties in moving the vibrator vehicle. If the vibrator has to be moved, other means for moving the vibrator are also provided. Flotation control 73 through communication wire means 55 can command valve 50 to provide more air into buoyancy tanks 47 or 48, thus causing the entire vibrator to float above the seabed.

With the vibrator in this position, thrusters 40, 42 or 44 or a combination of all of them can be energized by operating directional control apparatus 95 using "JOYSTICK" 115 and a control for the vertical thrusters (not shown). Directional control apparatus 95 may communicate through wire means 39 to junction boxes 96, 97 and 98. Control to these boxes will provide forward, rearward or vertical thrust to thrusters 40, 42 or 44, causing the vibrator apparatus to either rotate, move forward or move backward or up to down at the command of the operator through movement, for example, of a universal control or "JOYSTICK" 115.

Once the vibrator has been positioned into a location for the beginning of the survey, if the vibrator is being moved by locomotion control 113, then it is simply rendered inoperative. If it is being moved by directional control 115, then the buoyancy tanks must be refilled with water by operating flotation control system 73 through wire 55 to control valve 50. Air will then be released from buoyancy tank 47 or 48 causing water to enter the tank and resulting in a decrease in buoyancy of frame which will cause the vibrator system to settle onto the seabed. The weight (or buoyancy) of frame 10 will provide additional hold down force to vibrators 25 and 26 for a proper signal to be transmitted into the seabed. Once the vibrator is properly positioned on the seabed, the necessary vibratory commands must be sent to the vibrator in order to carry out the survey in accordance with prescribed procedures. In order to provide coupling to the ground, vibrator command unit 105 is operated sending a signal to wire means 59 to valve 58. Operation of valve 58 will cause release of hydraulic fluids from conduit 35 and pressure through conduit 33 will then be applied, driving piston rod 32 downward which will drive ground engaging means 28 into the seabed.

The hydraulic system is energized, if it has not been previously done so, and hydraulic pressure is then applied through conduits 109 to control valve 87. When it is desired to operate the vibrator in the usual manner, vibrator electronic system 85 will transmit a control signal down wire means 86 to control valve 87. This control valve will cause proper distribution of the hydraulic fluid to mass 81 which contains cylinders therein which apply force against mass 81. The force being applied against mass 81 will cause the frame 116 to move, creating a force against ground engaging means 28 and transmitting a shear wave into the seabed. The operation of the vibrator is, of course, well described in U.S. Pat. No. 4,143,736 which has been previously cited. Once the transmission is complete, a signal is sent to the vibrator position command 105 down wire means 59 to control valve 58 causing hydraulic fluid in conduit 33 to be reduced and hydraulic fluid in conduit 35 to be increased, lifting the piston rods 32 in an upward direction and disengaging or causing ground engaging means 28 to be disengaged from the seabed.

Once the base plate and engaging means are lifted out of the seabed, the vibrator is free to move. If the distance is relatively short, locomotion control apparatus 113 is energized, causing a control signal to be transmitted down wire 114 to drive motors 110. The track 20 will then be moved by gears 16 causing the vibrator to move forward (or backward) to a new seismic location. Of course lights 63 and 65 and television camera 66 will provide visual information of the movement. If gas pressure in tank 78 becomes depleted, additional gas can be provided through compressor 118 and transmitted to a conduit 119 to valve 120 which can be manually controlled by control means 121 or automatically controlled by any means not shown. The air will then be piped through a conduit 122 to tank 78.

Ballast means can be incorporated other than a pressure tank as illustrated in FIG. 1. Such additional ballast means are illustrated in FIGS. 3 and 4. In these figures a ballast tank 47 is illustrated which is maintained at the near neutral buoyancy of the vibrator, that is, tank 47 contains sufficient fluid so that the vibrator system will be nearly neutrally buoyant. A pressure tank 78 is coupled through a conduit 51 to a control valve 77 as previously described. A control box 130 is coupled to control wire 76 from flotation control apparatus 73. Valve 77 is coupled through a wire 131 to junction box 130, and a second control box 132 is coupled through a wire 133 to junction box 130. A second conduit 134 is coupled from control valve 77 to a new tank 135. A water release pipe 136 is coupled to control valve 132 and a dumping conduit 137 is coupled to control valve 132. A second dumping conduit 138 is coupled to control valve 77.

Operation of the device illustrated in FIG. 3 is as follows:

As previously mentioned tank 47 is designed so that its size and water content will render the vibrator nearly neutrally buoyant. A second tank 135 is sized to provide adequate buoyancy for the vibrator for its intended use, so that the vibrator can sink or rise depending upon whether tank 135 is full of water or is emptied of water. Tank 78 which contains air under pressure is coupled to control valve 77. If it is desired to cause the vibrator to sink, then additional water must be added to tank 135. In order to accomplish this, valve 132 is commanded to open by wire 133. Valve 77 is also commanded to open venting port 138. Venting port 138 will permit air to pass up conduit 134 and out conduit 138. Simultaneously therewith water will pass into pipe 137 through valve 132, down conduit 133 and into tank 135. Once tank 135 has sufficient amount of water to ballast the vibrator to a position where it will sink, both valves can be closed off. If it is desired to raise the vibrator, then valve 132 is actuated, opening port 137 and valve 77 is actuated, causing air pressure to pass from tank 78 through conduit 51 and conduit 134 into tank 135. The increase in air pressure in tank 135 will cause water to pass up conduit 136 and exit port 137. Once the vibrator is in the desired position, the valves 132 and 77 can be closed by operation of the flotation apparatus control unit 73. Additional air can be supplied to tank 78, if necessary, down conduit 122.

In FIG. 4 another ballasting system is illustrated which has advantages over the previously disclosed systems in that the tank 47 is not pressurized. In both the systems described in FIGS. 1 and 2 and that described in FIG. 3, all tanks are pressurized and may have to withstand the full pressure of the sea water at whatever depth the vibrator is being operated.

In FIG. 4 a free-flooding system is shown, and, in this case, tank 47 has a plurality of holes 140 so that sea water is free to move in and out of the holes as illustrated by arrows 141. In order to maintain a proper ballast, a constant depth of water illustrated by line 142 must be maintained. In order to accomplish this, a level sensing apparatus 143 is illustrated, such as a float which is coupled to a wire 144 to control box 130. Output from control box 130 through a wire 131 is coupled to valve 77. Likewise, command signals from flotation control 73 are coupled down wire 76 to control box 130. The operation of the system is as follows: A particularly designed buoyancy is achieved by pumping air from tank 78 through conduit 51 and control valve 77 into tank 47. As the air pressure increases in the tank, water will flow out of the tank in the direction of arrows 141 through holes 140. As the vibrator begins to sink, however, pressure will begin to increase through the holes 140. As the pressure increases the volume of air inside the tank will begin to shrink. This will cause the water level 142 to rise in the tank. Such a rise in water level will be detected by a level sensing apparatus 143. Level sensing apparatus 143 will communicate this fact through wire 144 to control box 130 which will command through wire 131 valve 77 to open, causing air to pass from tank 78 into tank 47. As the air pressure increases the water will again be forced out of holes 140 causing the level 142 to drop and thereby maintain the ballast at the same weight as previously required. If it is desired to change the ballast inside tank 47, then commands down wire 76 will cause the air pressure in tank 47 to either increase or decrease, depending upon whether it is desired to increase or decrease the flotation.

Figure 5:
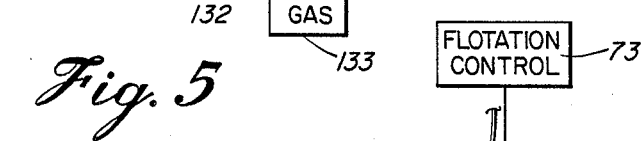
FIG 5 is a schematic drawing of an emergency ballast system.

Referring to FIG. 5, an emergency flotation system is illustrated and includes an air bag 120 coupled through a pipe 131 to a pressure release valve 132. Valve 132 is connected by a pipe to the compressed air pipe 122 which is connected through the umbilical cable 61 to the compressed air source 118. A source of compressed gas 133 is connected through a pipe 134 to a hand valve 135 and to valve 132. In operation, valve 132 is normally open when there is no air pressure in lines 122. Such a situation would develop if umbilical cable 61 broke. Compressed gas, which may be any gas which gives maximum flotation for the storage requirements will pass from cylinder 133 through valve 132, pipe 131 and to air bag 130 inflating it. The quantity of gas in cylinder 133 and the size of air bag 130 are selected to float the vibrator and return it to the surface. If power fails for any reason on the vibrator making it impossible to refloat the vibrator, the surface compressor 118 need merely be shut off and the air removed from pipe 122. The emergency flotation system as shown describes such function. On the surface, valve 135 will be closed until the vibrator apparatus is ready to sink, whereupon compressor 118 must be turned on before valve 135 is opened which would be required normally prior to sinking the vibrator assembly. It is obvious, of course, that more than one air bag 30 on cylinder 134 can be used.

CONCLUSIONS

A shear wave vibrator has been described which provides extreme flexibility in a water environment. The vibrator can be moved from one position to another either using the motion of a track-type or wheel-type apparatus, or it can be moved using proper flotation and thrusters. The vibrator can be positioned and moved as the seismic survey requires.

It is obvious that changes can be made in the application and still be within the spirit and scope of the invention as disclosed in the specification and appended claims.

What is claimed is:

1. An underwater vibrator for use in a body of water having a surface and a seabed, comprising:
   (a) a frame;
   (b) locomotion means confined within said frame and attached to said frame for moving said frame over said seabed;
   (c) cable means connected between a surface support means on the surface of said water and said underwater shear wave vibrator;
   (d) buoyancy means attached to said frame means;
   (e) means for selectively controlling said buoyancy means;
   (f) vibrator means attached to said frame and disposed under said frame;
   (g) hydraulic lift means positioned normal to the surface of said frame, slidably mounted through said frame, and attached to said vibrator means for engaging and disengaging said vibrator means from said seabed; and
   (h) means carried by said cable means for controlling said hydraulic lift means, said vibrator means, said buoyancy means, and said locomotion means.

2. Apparatus as described in claim 1 wherein said buoyancy means comprises a pair of tank means, one tank means having weight sufficient so that the apparatus is nearly buoyant in the water and the remaining tank means adjustable in water content so that the flotation can exceed the weight of said vibrator with water from said second tank displaced.

3. Apparatus according to claim 1 wherein said locomotion means comprises a plurality of thrust means mounted on said frame and wherein at least one thrust means has its direction of thrust at an angle to the thrust direction of another of said thrust means.

4. Apparatus as described in claim 1 or 2 wherein said flotation means is free flooding.

5. Apparatus as described in claims 1, 2, or 3 wherein said frame has a longitudinal axis, wherein said locomotion means is attached to the side parallel to said longitudinal axis, and wherein said vibrator means generate a shear wave which develops its force along an axis normal to the axis of said frame.

6. Apparatus as described in claim 1 or 2 wherein said locomotion means include a track means attached to each side of said frame and in engagement with the seabed.

7. Apparatus as described in claim 1 or 2 wherein said locomotion means comprises a track means attached to each side of said frame and a plurality of thrusters attached to said frame and developing thrust on a horizontal, vertical and normal direction to the longitudinal axis of said frame.

8. Apparatus as described in claim 1, 2 or 3 including emergency flotation system comprising an inflatable bag; gas reservoir means coupled to said bag through a valve means; and means for actuating said valve means to inflate said bag.

9. In an undersea vibrator apparatus controlled by a surface support vehicle, said vibrator apparatus having a frame, vibrator means attached to said frame or selectively engaging the seabed to generate a seismic signal therein, locomotion means attached to said frame for moving said frame in said sea, and flotation means for selectively adjusting the buoyancy of said vibrator apparatus, an emergency flotation system comprising:
   (a) a reservoir;
   (b) a compressed gas storage means;
   (c) a valve means;
   (d) means coupling said compressed gas storage means through said valve means to said reservoir; and
   (e) means for opening said valve means to communicate gas from said compressed gas means to said reservoir for increasing the flotation of said vibrator apparatus.

10. Apparatus as described in claim 9 wherein said reservoir is an inflatable air bag.

11. Apparatus as described in claim 9 wherein said surface support vehicle includes an air compressor connected through a pipe to said vibrator apparatus for supplying air under pressure to said vibrator apparatus, and wherein said valve means is maintained in a closed position by said air pressure.

12. An underwater shear wave vibrator for use in a body of water having a surface and a seabed, comprising:
   (a) a frame having an upper surface and sides horizontally disposed;
   (b) locomotion means attached on opposite sides of said frame and having means for contacting the seabed and moving said frame over said seabed;
   (c) cable means connected between a surface support means on the surface of said water and said underwater shear wave vibrator;
   (d) buoyancy means adapted to contain water, attached to said frame means;
   (e) means for selectively controlling the quantity of water in said buoyancy means;
   (f) shear wave vibrator means attached to said frame and disposed under said frame;
   (g) hydraulic lift means positioned normal to the surface of said frame, slidably mounted through said frame, and attached to said vibrator means;
   (h) horizontal frame positioning means attached to said frame; and
   (i) means carried by said cable means for controlling said hydraulic positioning means, said vibrator means, said buoyancy means, said horizontal positioning means, said locomotion means and said data monitoring means.

13. Apparatus as described in claim 12 wherein said buoyancy means comprise a pair of tank means, one tank means having weight sufficient so that the apparatus is nearly buoyant in the water and the remaining tank means adjustable in ballast so that the buoyancy can exceed the weight of said vibrator with water displaced.

14. Apparatus according to claim 12 wherein said horizontal positioning means comprises a plurality of thrust means mounted on said frame and wherein at least one thrust means has its direction of thrust at an angle to the thrust direction of another of said thrust means.

15. Apparatus as described in claim 12 or 13 wherein said buoyancy means is free flooding.

16. Apparatus as described in claims 12, 13, or 14 wherein said frame has a longitudinal axis, wherein said locomotion means is attached to the side parallel to said longitudinal axis, and wherein said shear wave vibrator means develops its force along an axis normal to the axis of said frame.

17. Apparatus as described in claim 12 wherein said locomotion means comprises a track.

18. Apparatus as described in claim 12 where said locomotion means comprises a track and wherein said horizontal frame positioning means comprises a three axis thruster means.

19. Apparatus as described in claim 12, 13, 17, or 18 cluding an emergency flotation system comprising:
  (a) a reservoir;
  (b) a compressed gas storage means;
  (c) a valve means;
  (d) means coupling said compressed gas storage means through said valve means to said reservoir; and
  (e) means for opening said valve means to communicate gas from said compressed gas means to said reservoir for increasing the flotation of said vibrator apparatus.

* * * * *